United States Patent [19]

Gur

[11] Patent Number: 4,566,766

[45] Date of Patent: Jan. 28, 1986

[54] IMAGE TRANSMISSION DEVICES

[75] Inventor: Yehoshua Gur, Jerusalem, Israel

[73] Assignee: Gur Optics and Systems, Ltd., Jerusalem, Israel

[21] Appl. No.: 489,903

[22] Filed: Apr. 29, 1983

[30] Foreign Application Priority Data

Mar. 18, 1983 [IL]  Israel .................................. 68176

[51] Int. Cl.⁴ .............................................. G03B 21/28
[52] U.S. Cl. ........................................................ 353/122
[58] Field of Search ................... 353/122, 121, 74, 76, 353/77, 78, 27 R, 27 A, 81, 82, 30, 11–14, 34, 46, 48, 49; 358/200, 199, 240, 242, 212, 331; 250/578, 213 R, 227; 350/96.14, 96.25, 96.11

[56]  References Cited

U.S. PATENT DOCUMENTS

| 3,712,724 | 1/1973 | Pratt ................................ 353/38 X |
| 3,800,149 | 3/1974 | Lang ............................... 358/200 X |
| 3,877,800 | 4/1975 | Liddell ............................... 353/30 |
| 4,154,515 | 5/1979 | Yevick ................................ 353/38 |

FOREIGN PATENT DOCUMENTS 960070  12/1974  Canada ................................ 353/121

Primary Examiner—Harry N. Haroian
Attorney, Agent, or Firm—Sughrue, Mion, Zinn, Macpeak & Seas

[57]  ABSTRACT

There is provided a compact image transmission and modification device. The device comprises a base element defining on a first surface thereof at least one first array of locations having a first interlocation spacing and defining on a second surface thereof at least one second array of locations corresponding to the first array of locations and having a second interlocation spacing, and a plurality of electrical signal transmission means, each of the means associating a location of the first array with corresponding location of the second array. There is also provided means for imparting to the base element a continuous rotary movement about a rotation axis defined therein to provide a scanning movement thereof, wherein the image modification produced by the device is substantially a function of the ratio between the first interlocation spacing and the second interlocation spacing.

26 Claims, 16 Drawing Figures

IMAGE TRANSMISSION DEVICES

The present invention relates to image transmission devices, in particular dimensionally compact image transmission devices.

For the purpose of the present invention, an image transmission device is understood to refer to a device in which the optical image is transmitted from a first image surface via transmission means to a second image surface where it can be viewed and/or recorded. During this transmission process, the original image is modified inasmuch as it may undergo positive or negative magnification (i.e., reduction), or zero magnification (i.e., may be left unchanged in scale). The term "image modification" as used herein also covers intentional image distortion for aesthetic, coding or other purposes.

A well-known image transmission device is, for instace, a microfilm or microfiche reader, in which an object, in this case a transparency, is imaged and projected onto a screen where, suitably magnified, it can be viewed by the user. Conventional readers of this type employ one or more lenses arranged in a predetermined spatial relationship with respect to the object. Now a significant difficulty with magnification systems employing lenses is that they are large relative to the dimensions of the lens or to its focal length, since their minimum dimension along their optical axis is limited by the relationship between the object-to-image distance and the focal length of the lens, which in turn is limited by its diameter. It follows that the bulkiness of a magnification system using lenses is one of the major limitations as to its usefulness.

It is one of the objectives of the present invention to overcome the limitations and drawbacks of the prior-art devices and to provide an image transmission device the image modification of which (positive, negative or zero magnification) is not exclusively a function of the refractive power of lenses and the length of its optical axis, and which therefore can be accommodated in a relatively compact, flat housing.

This the invention achieves by providing a compact image transmission and modification device comprising:

a base element defining on a first surface thereof at least one first array of locations having a first interlocation spacing and defining on a second surface thereof at least one second array of locations corresponding to the first array of locations and having a second interlocation spacing;

a plurality of electrical-signal transmission means, each of said means associating a location of said first array with a corresponding location of said second array;

means for imparting to said base element a continuous rotary movement about a rotation axis defined therein, to provide a scanning movement thereof, wherein the image modification produced by said device is substantially a function of the ratio between said first interlocation spacing and said second interlocation spacing.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
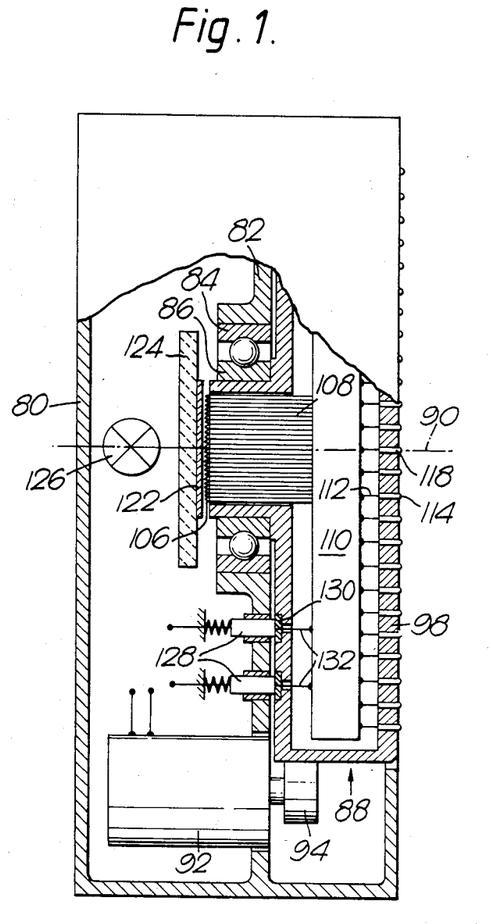
FIG. 1 is a partly cross-sectional side view of a first embodiment of the device according to the invention.

Referring now to the drawings, there is seen in FIG. 1 a housing 80 comprising a partition wall 82 in an opening of which is mounted a ball bearing 84. Into the inner race of this bearing is tightly fitted the hub portion 86 of a relatively narrow base element or drum 88 which can thus rotate about its central axis 90 and can be made to do so by an electric motor 92 having a friction roller 94 biased against the periphery of the drum 88.

The drum 88 is delimited by two plane, parallel surfaces, a first surface 96 closing off the hollow hub 86 (see FIG. 2), and a second, much larger, surface 98 closing off the opposite end of the drum 88. On the first surface 96 there is arranged a first array of locations 100 which, in this preferred embodiment, is cruciform and is constituted by a central location 102 surrounded by four line arrays 104, each comprising a plurality of locations 106. Each of these locations 106 (as well as the central location 102) represents in fact an input device consisting of a photodetector which, when hit by a light ray, produces an electric current in dependence on light intensity. Via leads 108, these photodetectors are connected to a processor 110, accommodated inside the drum 88 and comprising amplifiers as well as current regulators. The output from the processor 110 is led via another plurality of leads 112 to locations 114 of a second array 116 (FIG. 3) arranged on the second surface 98, each of which locations 114 (as well as a center location 118) represents in fact an output device consisting of a light-emitting diode (LED). The second array 116 is not only equally cruciform, being constituted by the central location 118 surrounded by four line arrays 120, but there is a one-to-one correspondence between the photodetectors of the first array 100 and the LED's of the second array 116, the latter being a perfect homologue of the former. Thus when one of the photodetectors in the first array 100 is stimulated, its correspondent counterpart in the second array 116 will light up. Both cruciform arrays 110, 116 are also of the same orientation.

The object to be magnified, e.g., a section of a microfiche 122, is mounted on a carrier glass plate 124 in close proximity to the first surface 96 (FIG. 2) and the first array 100 arranged thereon. The carrier plate 124, in a manner per se known, can be moved about in a plane perpendicular to the axis 90, so that every section of the microfiche can be reached.

Figure 2:
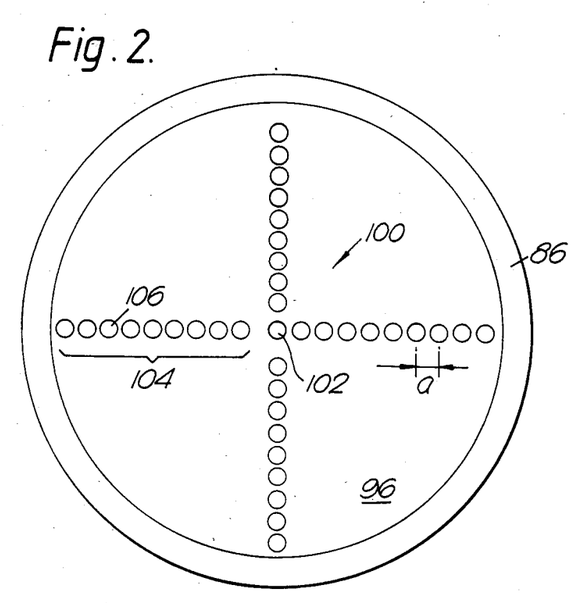
FIG. 2 is a view, to a larger scale, of the first surface and of a preferred embodiment of the first array.
Figure 3:
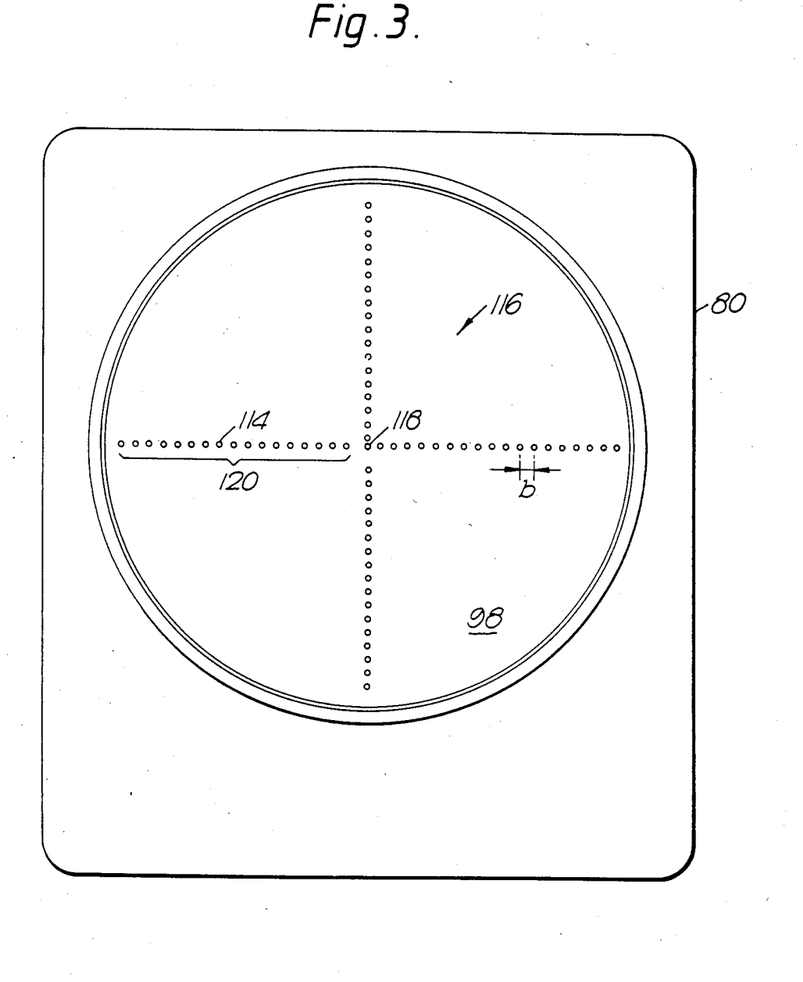
FIG. 3 is a front view of the apparatus according to the invention, showing also the second surface and a preferred embodiment of the second array.

When now light from the light source 126, modulated by the different densities of the transparency 122, hits the cruciform first array 100, the cross of the second array 116, fed by the processor 110, will light up, too, depending on the photocurrents generated by the correspondent photodetectors. Yet at this stage, all that can be seen are brighter or darker light spots along a cross shape. However, as soon as the electric motor 92 is switched on and sets the drum 88 rotating, the photodetectors of the first array 100 start "scanning" the transparency 122, the LED's light up accordingly and, provided the drum 88 rotates at a sufficiently high speed, an enlarged image is produced by the LED's of the second array 116 that, to the viewer, appears to be continuous. Magnification is determined by the ratio: interlocation spacing b of the second array 116 (FIG. 2) to interlocation spacing a of the first array 100 (It should be noted that FIG. 2 is drawn to a much larger scale than FIG. 3. In reality a<b).

Resolution of the system is determined by the interlocation distance a of the first array and can be substantially increased by the simple device of radially offsetting the separate line arrays 104 relative to one another by a radial distance equaling the diameter of the location 106 divided by the number of line arrays to the array pattern, in this case four. This is clearly seen in FIG. 2, where the "c o'clock" line array is continguous with the center location 102, the "12 o'clock" array is no longer touching the center location 102, and the "9 o'clock" and "6 o'clock" arrays move progressively farther away. Obviously the line arrays 120 of the second array of locations 116 must be similarly offset.

The power needed by the processor 110 is fed to the rotating drum 88 via stationary brushes 128 which make contact with slip rings 130 attached to the drum 88, and leads 132.

The light source 126 need not necessarily be placed as shown in FIG. 1. A larger bulb, including a reflector and, possibly, a condensor lens, could be accommodated in the upper left corner of the housing 80, the light being "piped" to the carrier 124 and the transparency 122 by means of a bundle of optical fibers or by means of a mirror or prism.

While LED's give adequate service in normally lit rooms, they are less than satisfactory under conditions of direct sunlight such as would obtain, e.g., in cockpits of airplanes, where the apparatus according to the invention might be used as a map projector. For service under such conditions, the LED's could be replced by liquid-crystal devices (LCD's) which do not emit light, but rather control the reflexion of incident light.

Figure 4:
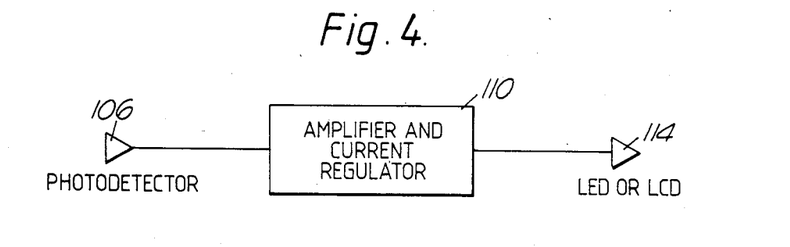
FIG. 4 is a block diagram of the electronic circuiting interposed between the first array and the second array.

FIG. 4 is a block diagram of the electronic processor 110, comprising an amplifier and current regulator for each photodetector and associated LED or LCD. Also controlled by the processor 110 is the luminance drop, felt by the viewer, with increasing distance, from the axis of rotation, of the LED's, due to the increasing peripheral velocity of the latter. This phenomenon can be compensated for electronically by making amplification also a function of radial distance of the individual LED from the axis 90.

While for the above detailed embodiment the cruciform pattern of arrays was found most suitable, other patterns may be used as well. Such alternative patterns would include patterns with either more or less line arrays than the cruciform arrangement discussed above, with a single line array being obviously the minimum for a full scan. Another possibility would be a spiral pattern with one or more arms.

It is clear from FIG. 1 that the image-defining device or transparency 122 has to be located very close to the first surface 96 and the first array 100 in order to produce thereon a reasonably sharp image. Too close a proximity, on the other hand, is liable to cause the transparency 122 to contact the rotating first surface 96, possibly resulting in damage to the transparency 122 as well as to the first array 100.

Figures 5, 6:
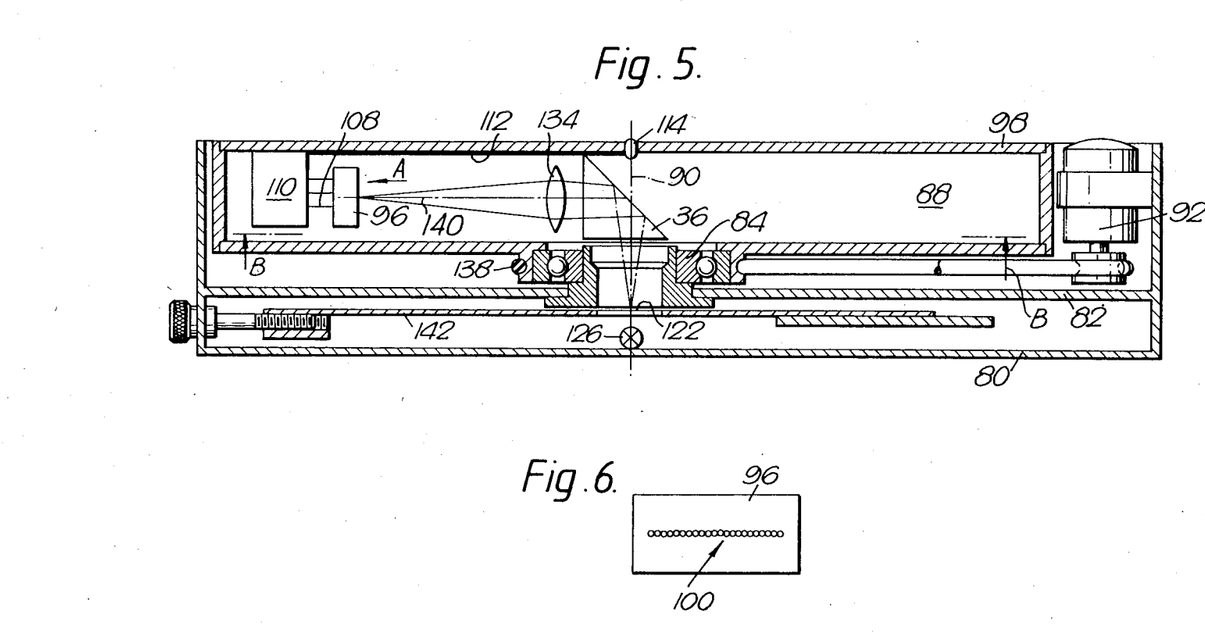
FIG. 5 is a cross-sectional view of a second embodiment including a lens system.
FIG. 6 is a schematic frontal view, in direction of arrow A in FIG. 5, of the array of photodetectors.
Figure 7:
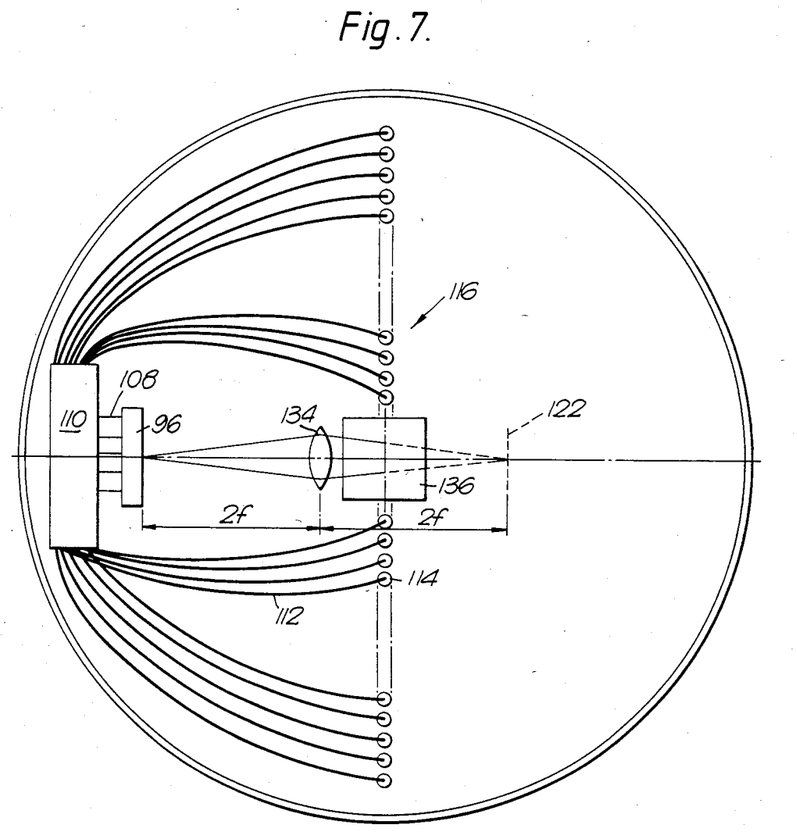
FIG. 7 is a schematic inside view, a seen in direction of arrows B in FIG. 5, of the base element of the embodiment of FIG. 5.

This difficulty is overcome in the embodiment shown in FIGS. 5-7 where, as can be clearly seen, there are no rotating components in the immediate vicinity of the transparency 122 which could damage it by coming in contact with it, as in this embodiment the first surface 96 and the first array 100 is inside the drum 88, off the central axis 90 and thus far removed from the transparency 122. The first surface 96 is perpendicular to the plane of the transparency 122 and the second surface 98, and the configuration of the first array 100 is seen in FIG. 6, a view in direction of arrow A in FIG. 5. The transparency 122 is imaged on the first surface 96 by a lens 134 via a deflecting prism 136. The lens 134, having a focal length of f, is located at a distance 2f from both the transparency 122 (shown in FIG. 7 in the "unfolded" position of the light rays) and the first surface 96. The transparency is thus imaged on the first surface 96 at zero magnification. When the drum 88 rotates (driven by the electric motor 92 via a belt 138), the image thrown onto the first surface 96 rotates about the optical axis 140 of the lens 134 and is thus "scanned" by the first array 100 which, relative to the axis 140, is stationary.

The first array 100 consists of photodetectors, e.g., photodiodes or CCD's (Change-Coupled Devices) which, when hit by light, produce a voltage that is proportional to the intensity of the light. Via leads 108, these voltages are led to the processor 110 in a predetermined sequence. From the processor 110, the suitably amplified signals are led via leads 112 to the output elements 114 of the second array 116 located on the second surface 98. These elements can be, e.g. LED's or LCD's. A carriage 142, movable along two axes, permits different portions of the transparency (e.g., a microfiche) to be viewed.

Although in this and the following embodiments magnification is fixed, depending as it does on the above-mentioned ratio, embodiments are possible in which, by mechanically shifting the lens 134, or by providing an additional lens or lenses, the image on the first surface can be premagnified, giving two or more total magnifications. A zoom arrangement would also be feasible.

The slip-ring and brush arrangement shown in FIG. 1, which is obviously required also in this as well as in the following embodiments, has been omitted in the relevant drawings for sake of clarity.

Figure 8:
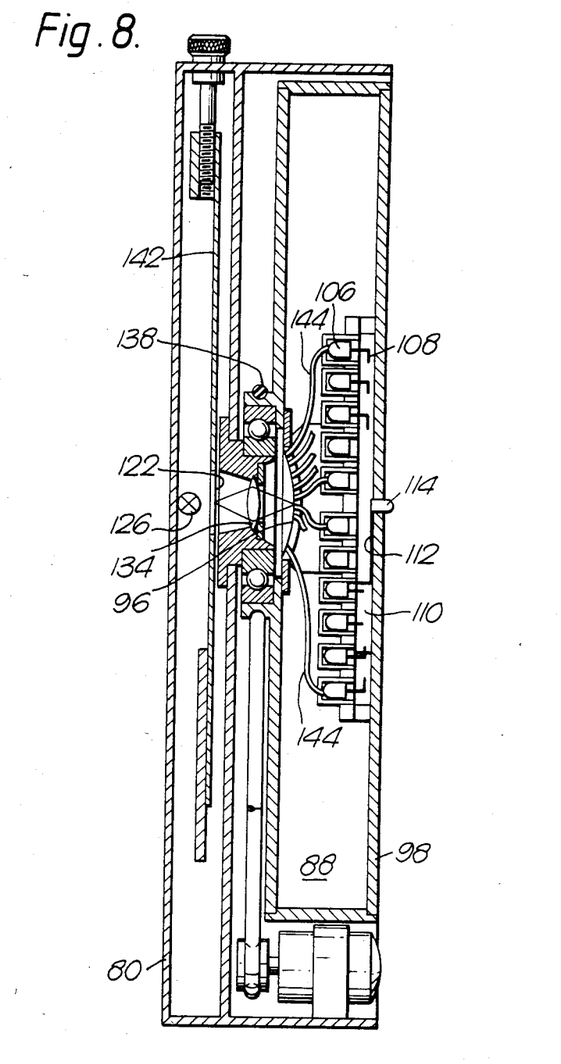
FIG. 8 is a cross-sectional view of another embodiment including a lens system as well as intermediate optical-fiber transmitters.

Another lens-equipped embodiment is shown in FIG. 8. Here there is no prism and the lens 134 is located between the transparency 122 and the first surface 96, at the distance 2f from either.

It is also seen that the first surface 96 (in which, as will be remembered, lies the first array 100) is slightly curved. This curved surface can be designed to follow the uncorrected field curvature of any lens or lens system, which permits the use of relatively cheap lenses without impairing the quality of the output image. A further advantage of this correction curvature is that it also improves the brightness of the peripheral image zones, which are otherwise severely affected by the so-called cosine-fourth law. Another beneficial effect of the interposed lens of this and similar embodiments is the depth of focus inherent in any optical system, which can absorb minor deviations from the theoretical object-image distance, such deviations as would be caused by a slight wobble of the rotating first surface 96. Also, the manufacturing and assembly tolerances of both mechanical and optical components can be far more generous, thus reducing production costs.

Another feature of this particular embodiment is the use of relatively large photodetectors 106, too large to be grouped together to form the first array 100 and still give adequate resolution. This problem is solved by using intermediate light guides in the shape of thin optical fibers 144, which are attached in "close formation" to the first surface 96, where their first ends constitute the first array 100. Behind the first surface 96 they fan out and are each connected to the corresponding detector 106 with their other ends.

Figure 9:
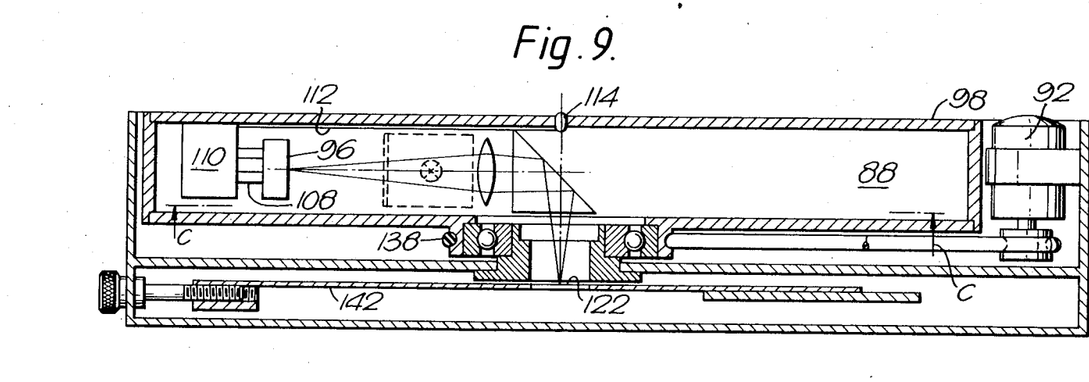
FIG. 9 is a cross-sectional view of yet another embodiment with a lens system, and based on reflected-light imaging.
Figure 10:
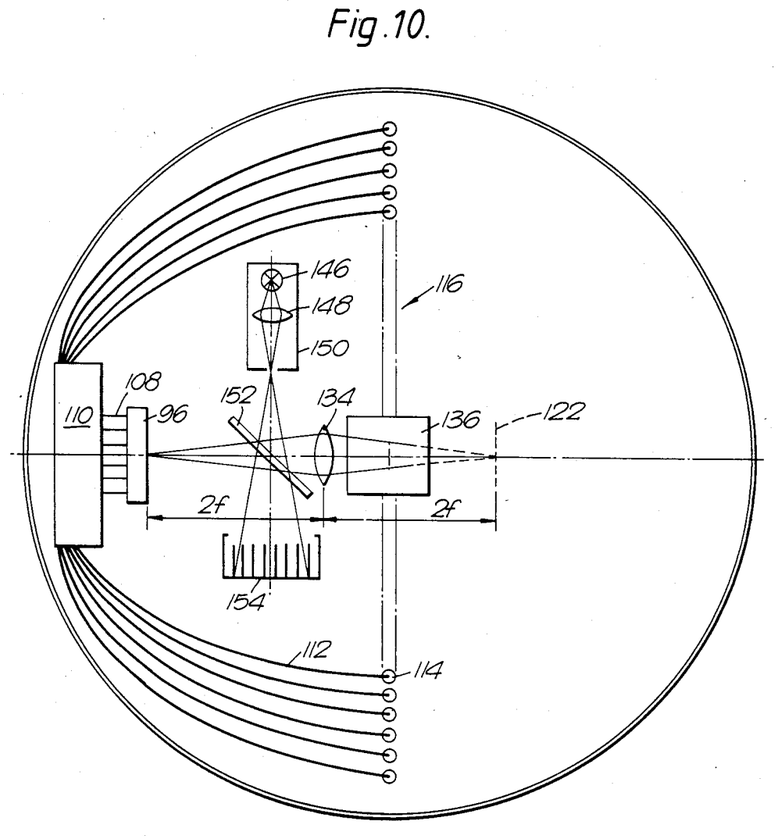
FIG. 10 is an inside view, in direction of arrows C of the base element of the embodiment of FIG. 9.

The embodiment illustrated in FIGS. 9 and 10 is similar to that of FIGS. 5–7 in that both have a deflection-prism/lens system imaging the transparency 122 on a first surface 96 located laterally and perpendicular to the plane of the transparency. There is, however, an important distinction: while the embodiment of FIGS. 5–7 works with transmitted light, the light source 126 being located below the transparency 122, the present embodiment operates with reflected light. To this end there is provided, inside the drum 88, a light source, comprising a bulb 146, a condenser lens 148 and a housing 150. Light from this source is thrown on a semi-transparent mirror 152, which deflects part of it via the lens 134 onto the transparency 122, whence it is reflected back through the lens and onto the first surface 96, having been appropriately modulated by the differing brightness values of the different portions of the transparency. To prevent undesirable stray light from reaching the photodetectors on the first surface 96, a light trap 154 is provided, which intercepts and eliminates that portion of light from the light source that passes the semi-transparent mirror 152.

Figure 11:
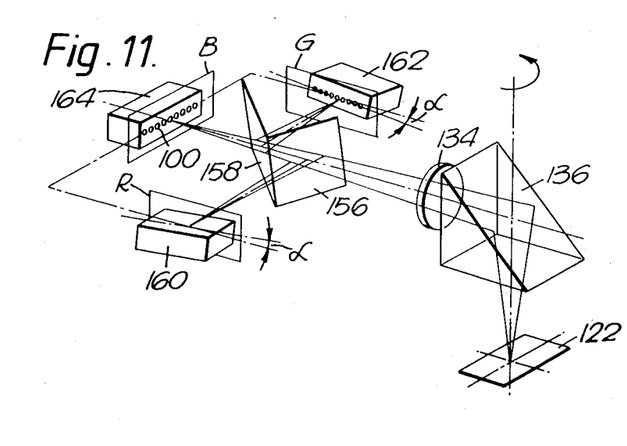
FIG. 11 shows a schematic perspective view of an embodiment according to the invention, capable of producing colored images.
Figure 12:
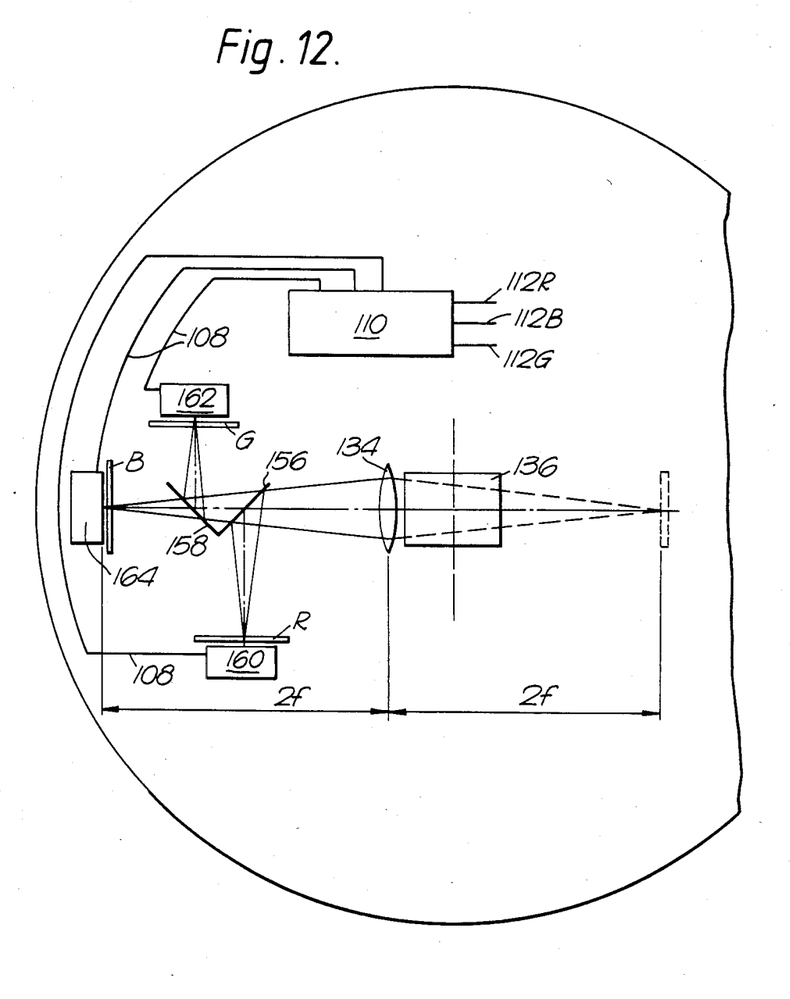
FIG. 12 is a schematic top view of the arrangement of FIG. 11.
Figure 13:
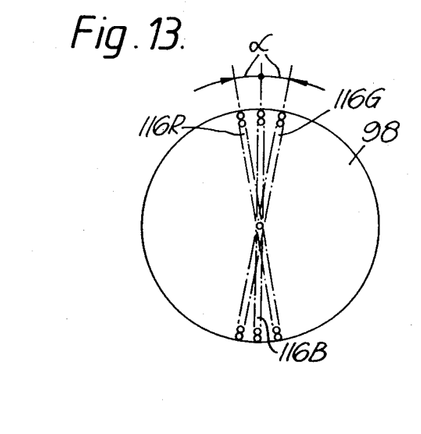
FIG. 13 is a view, to reduced scale, of the second surface and second arrays of the embodiment shown in FIGS. 11 and 12.

An embodiment of the invention suitable for colored transparencies is shown schematically in FIGS. 11–13. Via a first beam splitter 156, a first filter R (red), a second beam splitter 158, a second filter G (green), and a third filter B (blue), the lens 134 forms images on three photodetector units 160, 162 and 164, each of which has a complete first array 100. The signals produced by the separate arrays are fed to the processor 110 via the leads 108 (FIG. 12) and, after processing, to the second arrays 116R, 116B, 116G (FIG. 13) via corresponding leads 112R, 112B and 112G. As can be seen in FIG. 13, the three second arrays 116R, 116B and 116G include with one another angles $\alpha$. It is seen in FIG. 11 that the photodetector 160 (red) and the photodetector 162 (green) are tilted with respect to the horizontal by the same angle $\alpha$ while the photodetector 164 (blue) is horizontal. The associated first and second arrays are thus always of the same respective orientation. The LED's in each of the second arrays 116 are obviously selected to produce light of the required color.

Figure 14:
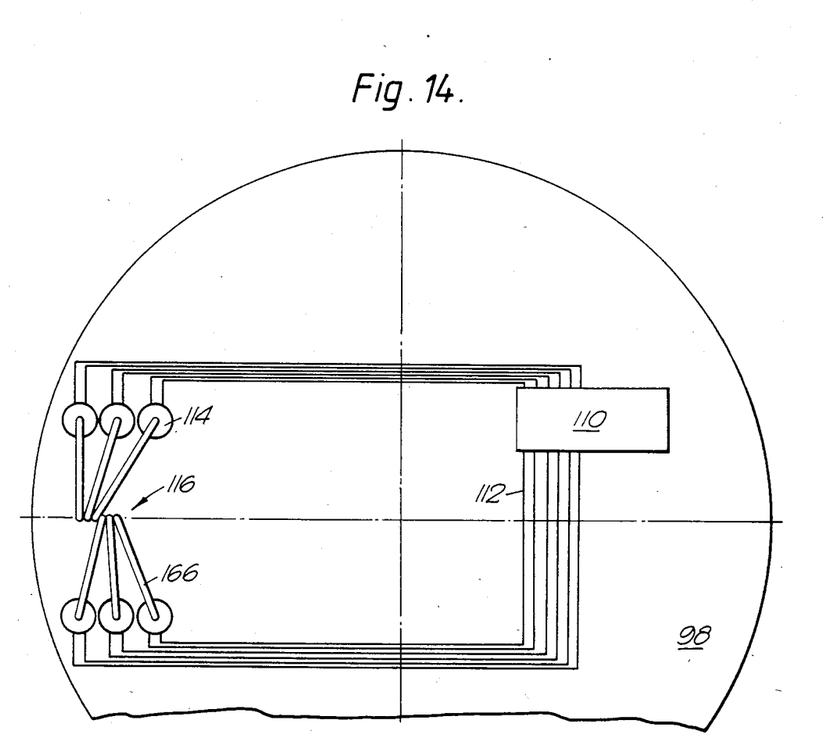
FIG. 14 is a schematic view of the underside of the second surface of an embodiment having final optical-fiber transmitters.

For high-resolution applications, available LED's 114 might sometimes be too large in diameter. The embodiment of FIG. 14, representing the underside of the second surface 98, shows a simple solution to this problem: The final output is effected by optical fibers 166, the juxtaposed ends of which constitute the second array 116, while their other ends are each connected to a corresponding LED. The various leads (112 and 108—not shown) can be parts of a printed circuit, of which the underside of the second surface 98 is the carrier.

Figure 15:
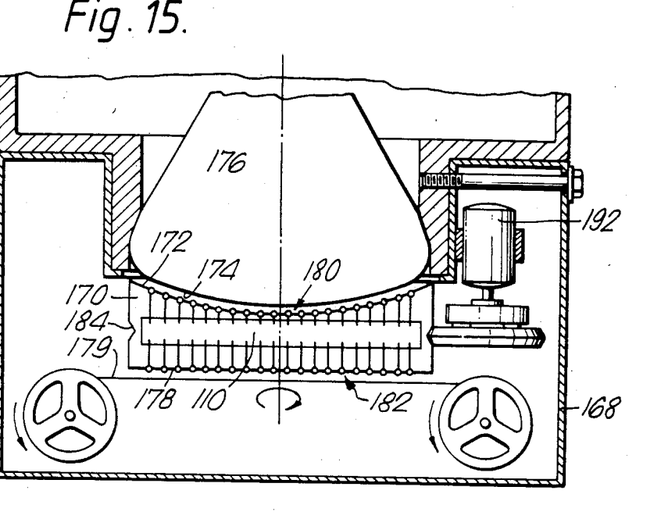
FIGS. 15 and 16 are a top view in partial cross section and a front elevation of the drum and its guide and drive rollers, respectively, of a CRT faceplate according to the invention.
Figure 16:
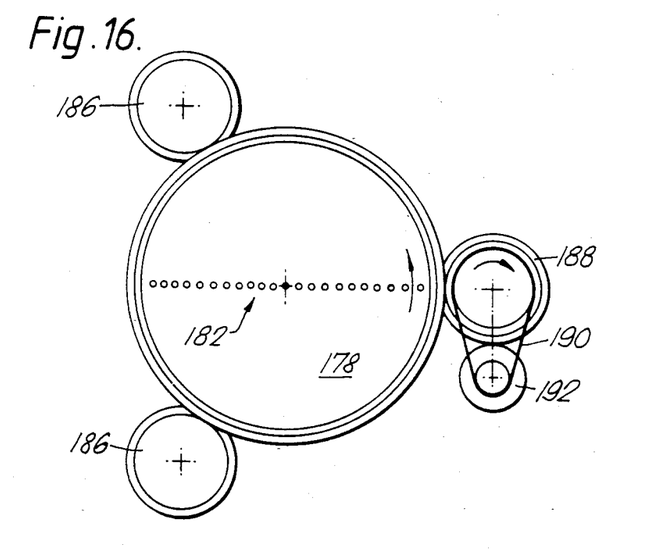

FIGS. 15 and 16 show another embodiment of the image transmission device according to the invention, in which image modification is zero, i.e., no magnification takes place. This device, called a cathode-ray tube (CRT) faceplate is used for the distortion-free transfer of the CRT display, produced on a spherical surface, to a plane surface, where it can be, e.g., photographed, again without distortion. Such faceplates, containing multitudes of carefully oriented optical fibers, are indeed available, but are very expensive, precisely because of the required careful spatial one-to-one correspondence of the fiber ends.

The present embodiment, conceived as an attachment to existing oscilloscopes, comprises a housing 168 attachable to the oscilloscope body. Inside the housing, there is provided a drum-like body 170 having a concave rear face 172 with a radius of curvature appropriate to the radius of curvature of the display surface 174 of the CRT 176 and a plane front face 178, past which there is led a photographic film 179 to record events on the CRT surface 174. On the concave rear face 172 of the drum 170 there is arranged a first array 180 consisting of photodetectors, and on its plane front face 178 there is arranged a second array 182 consisting of LED's, each LED being connected to its correspondent detector via a processor 110. Both arrays are located in the same, diametral plane. When now, in a manner to be explained below, the drum 170 is rotated, the rear array 180 "scans" the CRT display which, transmitted to the front array 182, is now fully visible on the rotating front face 178.

The drum 170 is provided with a V-shaped peripheral groove 184 in which engage two guide rollers 186 and one drive roller 188 which, in its turn, is driven via a belt 190 by an electric motor 192 attached to the housing 168. All rollers have a profile that is adapted to fit the groove 184 which profile is not necessarily V-shaped as shown, but could also be round. One of the rollers is spring-biased against the other two rollers and at least the drive roller 188 has a tire that is made of, e.g., rubber, to provide sufficient friction for friction-driving the drum 170.

Optical devices suitable for application of the present invention include, apart from those already mentioned, also slide and movie projectors as well as the transmitted-light microscope.

It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come with the meaning and range of equivalency of the claims are therefore intended to be embraced therein.

What is claimed is:

1. A compact image transmission and modification device in which an object is mountable in the optical path between a light source and a first surface on which the light from said source, modulated by the different optical densities of said object, is capable of constituting a first image thereof, and on which first surface said first image is transformed into electrical signals which are transmitted to a second surface where said electrical signals are transformed into light signals capable of constituting a second, modified, image of said object, said device further comprising:
   a base element incorporating said first surface and said second surface, and defining on said first surface at least one first array of locations having a first interlocation spacing, and on said second surface at least one second array of locations corresponding to said first array of locations and having a second interlocation spacing;
   photodetector means at said locations of said first array for producing said electrical signals;
   electrical-to-light signal-transforming means at said locations of said second array for producing said light signals;
   a plurality of electrical-signal transmission means, each of said means electrically coupling a location of said first array with a corresponding location of said second array; and
   means for imparting to said base element a continuous rotary movement about a rotation axis defined therein, to cause said first array to scan said first image, wherein the image modification produced by said device is substantially a function of the ratio between said first interlocation spacing and said second interlocation spacing.

2. The device according to claim 1, wherein said photodetector means are constituted by photodiodes and said electrical-to-light signal-transforming means are constituted by light-emitting diodes.

3. The device according to claim 1, wherein said electrical-to-light signal-transforming means are constituted by liquid-crystal devices.

4. The device according to claim 1, wherein said photodetector means are constituted by charge-coupled devices.

5. The device according to claim 1 wherein said first and second surfaces comprise planar surfaces which extend perpendicularly to the rotation axis and wherein said first and second arrays comprise planar arrays.

6. The device according to claim 1, wherein said first surface is located lateral of said rotation axis and is perpendicular to said second surface.

7. The device according to claim 1, wherein at least said first array is curved.

8. The device according to claim 1, wherein said second interlocation spacing is greater than said first interlocation spacing.

9. The device according to claim 1, wherein said first and second arrays are each constituted by at least one line array.

10. the device according to claim 1, wherein the pattern of said first and second arrays is cruciform, being constituted by four line arrays.

11. The device according to claim 10, wherein said line arrays are radially offset relative to one another by a radial distance equaling the diameter of said location divided by the number of line arrays to said pattern.

12. The device according to claim 1, wherein the ratio of the interlocation distances between any three locations in said first array is equal to the ratio of the interlocation distances between the corresponding three locations in said second array.

13. The device according to claim 1, further comprising a source of light disposed adjacent said first array to define an object, whereby said second array defines a directly viewable image.

14. The device according to claim 1, further comprising a positive lens system for enhancing the image to be transmitted by said electrical-signal transmission means.

15. The device according to claim 1, further comprising a deflecting prism centrally mounted with respect to said axis of rotation.

16. The device according to claim 1, further comprising a plurality of beam splitters and color filters for breaking up the images to be transmitted into primary colors.

17. The device according to claim 3, further comprising a plurality of optical fibers interposed between said first surface and said photodetector means.

18. The device as claimed in claim 3, further comprising a plurality of optical fibers interposed between said electrical-to-light signal-transforming means and said second surface.

19. The device according to claim 1, wherein said first and second interlocation spacings are equal.

20. A compact image transmission and modification device in which a light-pattern producing display element is located in proximity to a first surface on which the light from said element is capable of constituting a first image of said patterns, and on which first surface said first image is transformed into electrical signals which are transmitted to a second surface where said electrical signals are transformed into light signals capable of constituting a second, modified, image of said patterns, said device further comprising:
   a base element incorporating said first surface and said second surface, and defining on said first surface at least one first array of locations having a first interlocation spacing, and on said second surface at least one second array of locations corresponding to said first array of locations and having a second interlocation spacing;

photodetector means at said locations of said first array for producing said electrical signals;

electrical-to-light signal-transforming means at said locations of said second array for producing said light signals;

a plurality of electrical-signal transmission means, each of said means electrically coupling a location of said first array with a corresponding location of said second array;

means for imparting to said base element a continuous rotary movement about a rotation axis defined therein, to cause said first array to scan said first image, wherein the image modification produced by said device is substantially a function of the ratio between said first interlocation spacing and said second interlocation spacing.

21. The device according to claim 20, wherein said electrical-to-light signal transforming means are constituted by liquid-crystal devices.

22. The device according to claim 21, wherein said photodetector means are constituted by charge-coupled devices.

23. The device according to claim 20, wherein said first and second arrays are each constituted by at least one line array.

24. The device according to claim 20, wherein the pattern of said first and second arrays is cruciform, being constituted by four line arrays.

25. A compact image transmission and modification device in which an object is mountable in the optical path between a light source and a first surface on which the light from said source, modulated by the different optical densities of said object, is capable of constituting a first image thereof, which first image is transformed into electrical signals which are transmitted to a second surface where said electrical signals are transformed into light signals capable of constituting a second, modified image of said object, said device further comprising:

a base element incorporating said first surface and said second surface, and defining on said first surface at least one first array of locations having a first interlocation spacing, and on said second surface at least one second array of locations corresponding to said first array of locations and having a second interlocation spacing;

a plurality of light-guiding optical fibers, one end of each of which is disposed at a different one of said locations of said first array;

a plurality of photodetector means for producing said electrical signals, to the input side of each of which means is connected to the other end of the corresponding one of said optical fibers;

a plurality of electrical-to-light signal-transforming means at said locations of said second array for producing said light signals;

a plurality of electrical-signal transmission means, each electrically connecting the output side of a different one of said photodetector means to the input side of the corresponding one of said electrical-to-light signal-transforming means at said locations of said second array and, via said optical fibers, effectively coupling each location of said first array with a corresponding location of said second array, and means for imparting to said base element a continuous rotary movement about a rotation axis defined therein, to cause said first array to scan said first image, wherein the image modification produced by said device is substantially a function of the ratio between said first interlocation spacing and said second interlocation spacing.

26. A compact image transmission and modification device in which an object is mountable in the optical path between a light source and a first surface on which the light from said source, modulated by the different optical densities of said object, is capable of constituting a first image thereof, and on which first surface said first image is transformed into electrical signals, which electrical signals are transformed into light signals capable of constituting, on a second surface, a second, modified, image of said object, said device further comprising:

a base element incorporating said first surface and said second surface, and defining on said first surface at least one first array of locations having a first interlocation spacing, and on said second surface at least one second array of locations corresponding to said first array of locations and having a second interlocation spacing;

photodetector means at said locations of said first array for producing said electrical signals;

a plurality of light-guiding optical fibers, one end of each of which is disposed at a different one of said locations of said second array;

a plurality of electrical-to-light signal-transforming means for producing said light signals, to the output side of each of which is connected the other end of the corresponding one of said optical fibers;

a plurality of electrical-signal tranmission means, each electrically connecting the output side of a different one of said photodetector means to the input side of the corresponding one of said electrical-to-light signal-transforming means and, via said optical fibers, effectively coupling each location of said first array with a corresponding location of said second array, and means for imparting to said base element a continuous rotary movement about a rotation axis defined therein, to cause said first array to scan said first image, wherein the image modification produced by said device is substantially a function of the ratio between said first interlocation spacing and said second interlocation spacing.

* * * * *